(12) United States Patent
Carroll et al.

(10) Patent No.: US 11,781,522 B2
(45) Date of Patent: Oct. 10, 2023

(54) WIND TURBINE ROTOR BLADE ASSEMBLY FOR REDUCED NOISE

(71) Applicant: General Electric Company, Schenectady, NY (US)

(72) Inventors: Christian Carroll, Simpsonville, SC (US); Murray Fisher, Greer, SC (US); Benoit Philippe Petitjean, Moosburg (DE); Andreas Herrig, Garching b. Muenchen (DE); Drew Adam Wetzel, Easley, SC (US); Jonathon Paul Baker, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 102 days.

(21) Appl. No.: 17/404,399

(22) Filed: Aug. 17, 2021

(65) Prior Publication Data

US 2021/0372364 A1    Dec. 2, 2021

Related U.S. Application Data

(63) Continuation-in-part of application No. 16/132,885, filed on Sep. 17, 2018, now abandoned.

(51) Int. Cl.
   *F03D 1/06*  (2006.01)
(52) U.S. Cl.
   CPC ........ *F03D 1/0633* (2013.01); *F05B 2230/50* (2013.01); *F05B 2240/211* (2013.01);
   (Continued)
(58) Field of Classification Search
   CPC ..... F03D 1/0608; F03D 1/0633; F03D 1/0641
   See application file for complete search history.

(56) References Cited

U.S. PATENT DOCUMENTS

| 2,718,267 A | 9/1955 | Woolf et al. |
| 4,343,238 A | 8/1982 | Koch et al. |

(Continued)

FOREIGN PATENT DOCUMENTS

| EP | 1152148 A1 | 11/2001 |
| EP | 2253839 A1 | 11/2010 |

(Continued)

OTHER PUBLICATIONS

IN First Examination Report for IN application No. 202117010847, dated Sep. 9, 2022 , 6 pages.

*Primary Examiner* — Topaz L. Elliott
*Assistant Examiner* — Michael K. Reitz
(74) *Attorney, Agent, or Firm* — Dority & Manning, P.A.

(57) ABSTRACT

A rotor blade assembly of a wind turbine includes a rotor blade having an aerodynamic body with an inboard region and an outboard region. The inboard and outboard regions define a pressure side, a suction side, a leading edge, and a trailing edge. The inboard region includes a blade root, whereas the outboard region includes a blade tip. The rotor blade also defines a chord and a span. Further, the inboard region includes a transitional region of the rotor blade that includes a maximum chord. Moreover, a unitless first derivative of the chord with respect to the span of the rotor blade in the transitional region ranges from about −0.10 to about 0.10 from the maximum chord over about 15% of the span of the rotor blade. In addition, the unitless first derivative of the chord with respect to the span a slope of a change in the chord in is greater than about −0.03 at an inflection point of the chord in the outboard region.

18 Claims, 9 Drawing Sheets

(52) U.S. Cl.
CPC ... *F05B 2250/711* (2013.01); *F05B 2250/712* (2013.01); *F05B 2260/96* (2013.01)

(56) References Cited

U.S. PATENT DOCUMENTS

| | | | |
|---|---|---|---|
| 5,474,425 A * | 12/1995 | Lawlor | F03D 1/065 |
| | | | 416/223 R |
| 6,105,182 A | 8/2000 | Elnar | |
| 6,503,058 B1 | 1/2003 | Selig et al. | |
| 8,061,996 B2 | 11/2011 | Herr et al. | |
| 8,408,871 B2 | 4/2013 | Herr et al. | |
| 8,419,371 B2 | 4/2013 | Herr et al. | |
| 8,678,770 B2 * | 3/2014 | Enevoldsen | F03D 1/0633 |
| | | | 416/223 R |
| 8,801,387 B2 | 8/2014 | Fukami | |
| 8,956,115 B2 | 2/2015 | Tobin et al. | |
| 9,399,919 B2 | 7/2016 | Bachmann et al. | |
| 9,790,795 B2 | 10/2017 | Fukami | |
| 10,823,139 B2 | 11/2020 | Hallissy et al. | |
| 2008/0181775 A1 | 7/2008 | Livingston et al. | |
| 2009/0297354 A1 | 12/2009 | Herr et al. | |
| 2010/0135814 A1 | 6/2010 | Bakhuis et al. | |
| 2011/0176928 A1 | 7/2011 | Jensen | |
| 2012/0020803 A1 | 1/2012 | Lees et al. | |
| 2012/0121430 A1 | 5/2012 | Olsen et al. | |
| 2012/0219423 A1 | 8/2012 | Fischer | |
| 2013/0101426 A1 | 4/2013 | Saitou et al. | |
| 2013/0177433 A1 | 7/2013 | Fritz et al. | |
| 2014/0186175 A1 | 7/2014 | Bachmann et al. | |
| 2014/0328693 A1 | 11/2014 | Wilson et al. | |
| 2014/0341738 A1 | 11/2014 | Bech et al. | |
| 2014/0377076 A1 | 12/2014 | Kennedy et al. | |
| 2015/0064017 A1 | 3/2015 | Bohlen | |
| 2015/0064391 A1 | 3/2015 | Trondl | |
| 2015/0316025 A1 | 11/2015 | Enevoldsen et al. | |
| 2016/0177915 A1 | 6/2016 | Gonzalez et al. | |
| 2016/0327019 A1 | 11/2016 | Tobin et al. | |
| 2016/0327020 A1 | 11/2016 | Tobin et al. | |
| 2019/0072068 A1 | 3/2019 | Fisher et al. | |
| 2019/0301427 A1 | 10/2019 | Karikomi | |

FOREIGN PATENT DOCUMENTS

| | | |
|---|---|---|
| EP | 2944802 A1 | 11/2015 |
| WO | WO92/01156 A1 | 1/1992 |
| WO | WO2018046067 A1 | 3/2018 |

* cited by examiner

WIND TURBINE ROTOR BLADE ASSEMBLY FOR REDUCED NOISE

FIELD

The present disclosure relates in general to wind turbine rotor blades, and more particularly to rotor blades having a low mass, low loads, and low noise design.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a main shaft coupling the rotor blades to a gearbox, or if a gearbox is not used, directly to the generator. More specifically, the rotor blades have a cross-sectional profile of an airfoil such that, during operation, air flows over the blade producing a pressure difference between the sides. Consequently, a lift force, which is directed from a pressure side towards a suction side, acts on the rotor blade. The lift force generates torque on the main shaft, which is geared to the generator for producing electricity. The generator then converts the mechanical energy to electrical energy that may be deployed to a utility grid.

The lift force is generated when the flow from the leading edge to the trailing edge creates a pressure difference between the top and bottom surfaces of the rotor blade. Ideally, the flow is attached to both the top and bottom surfaces from the leading edge to the trailing edge. However, when the angle of attack of the flow exceeds a certain critical angle, the flow does not reach the trailing edge, but leaves the surface at a flow separation line. Beyond this line, the flow direction is generally reversed, i.e., it flows from the trailing edge backward to the separation line. A blade section extracts much less energy from the flow when it separates. Further, flow separation can lead to an increase in blade noise. Flow separation depends on a number of factors, such as incoming air flow characteristics (e.g., Reynolds number, wind speed, in-flow atmospheric turbulence), characteristics of the blade (e.g., airfoil sections, blade chord and thickness, twist distribution, etc.), and operational characteristics (such as pitch angle, rotor speed, etc.).

For some wind turbines, a rise in noise at high wind speeds (often referred to as High Wind Speed Noise (HWSN)) has been observed. HWSN is produced by a thickening pressure-side boundary layer and, ultimately, flow separation at the rotor blade tip. Such phenomena occur if tip angles of attack and/or tip Reynolds numbers are too low. In addition, conventional rotor blades and joints thereof have certain complexities and/or loads associated therewith.

As such, the industry is continuously seeking improved rotor blades having reduced loads, improved performance, and/or increased structural efficiency.

BRIEF DESCRIPTION

Aspects and advantages of the invention will be set forth in part in the following description, or may be obvious from the description, or may be learned through practice of the invention.

In one aspect, the present disclosure is directed to a rotor blade assembly of a wind turbine. The rotor blade assembly includes a rotor blade having an aerodynamic body having an inboard region and an outboard region. The inboard and outboard regions define a pressure side, a suction side, a leading edge, and a trailing edge. The inboard region includes a blade root, whereas the outboard region includes a blade tip, the rotor blade defining a chord and a span. Further, the inboard region includes a transitional region of the rotor blade that comprises a maximum chord. Moreover, a unitless first derivative of the chord with respect to the span of the rotor blade in the transitional region ranges from about −0.10 to about 0.10 from the maximum chord over about 15% of the span of the rotor blade. In addition, the unitless first derivative of the chord with respect to the span is greater than about −0.03 at an inflection point of the chord in the outboard region.

In an embodiment, the unitless first derivative of the chord with respect to the span of the rotor blade in the transitional region ranges from about −0.06 to about 0.06 from the maximum chord over about 15% of the span of the rotor blade.

In another embodiment, the transitional region comprises from about 15% span to about 30% span of the rotor blade.

In further embodiments, the inboard region includes from about 0% span to about 40% span from the blade root of the rotor blade in a span-wise direction and the outboard region includes from about 40% span to about 100% span from the blade root of the rotor blade.

In additional embodiments, in the inboard region, the unitless first derivative of the chord with respect to the span ranges from about −0.15 to about 0.20. In further embodiments, in the inboard region, the unitless first derivative of the chord with respect to the span ranges from about −0.9 to about 0.125.

In yet another embodiment, wherein a unitless second derivative of the chord with respect to the span is greater than −0.00002 in the inboard region.

In still another embodiment, a peak of the unitless first derivative of the chord with respect to the span is less than about −0.3 between about 30% span to about 80% span from the blade root.

In several embodiments, a peak of the unitless first derivative of the chord with respect to the span is within about 80% span. In yet another embodiment, a peak in a radius of curvature of the chord inboard of the maximum chord of the rotor blade is located within about 11% span.

In an embodiment, the radius of curvature at the maximum chord is greater than about 2 millimeters. In another embodiment, a location of a peak chord radius of curvature is within about 80% span.

In another aspect, the present disclosure is directed to a method for manufacturing a rotor blade of a wind turbine to mitigate noise during high wind speed conditions. The method includes forming the rotor blade with an aerodynamic body having an inboard region and an outboard region, a span, and a chord, the inboard and outboard regions defining a pressure side, a suction side, a leading edge, and a trailing edge, the inboard region having a blade root and a transitional region that includes a maximum chord, the outboard region having a blade tip. The method also includes forming a unitless first derivative of the chord with respect to the span in the transitional region ranging from about −0.06 to about 0.06 over about 15% of a span of the rotor blade, wherein the unitless first derivative of the chord with respect to the span is greater than about −0.03 at an inflection point of the chord in the outboard region. It should be understood that the method may include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is a rotor blade assembly for a wind turbine that is optimized for chord slope (e.g., a unitless first derivative of a chord of the rotor blade with respect to the span), rate of change of the chord slope, and chord radius of curvature for reduced loads, reduced mass, reduced noise, and improved performance. The optimization of the chord slope (e.g., between 30 and 90% of span), particularly of a jointed rotor blade, reduces joint complexity while maintaining aerodynamic performance. In one embodiment, the rotor blade of the present disclosure may also have a larger tip chord to ensure higher Reynolds numbers. At higher Reynolds numbers, the boundary layer is less susceptible to thickening and ultimately separating. radius of curvature for reduced loads, reduced mass, reduced noise, and improved performance. The optimization of the chord slope (e.g., between 30 and 90% of span), particularly of a jointed rotor blade, reduces joint complexity while maintaining aerodynamic performance. In one embodiment, the rotor blade of the present disclosure may also have a larger tip chord to ensure higher Reynolds numbers. At higher Reynolds numbers, the boundary layer is less susceptible to thickening and ultimately separating.

Accordingly, the rotor blade of the present disclosure may have a larger tip chord as compared to conventional rotor blades in order to reduce the effective angles of attack by unloading the tip due to a more favorable induced angle of attack distribution. For example, if a rotor blade were to be designed without concern for loads and noise, an ideal axial induction (AI) (such as about 0.3333) would be targeted, thereby leading to a chord based on the airfoil seed picked for the design. If this airfoil seed were changed, a different ideal chord would be selected. This ideal AI target places that airfoil seed at its ideal design point (i.e., highest lift-drag ration (LID)). If the chord is increased from this ideal value, twist is needed to maintain the ideal AI. Thus, the present disclosure provides a rotor blade that departs from the ideal design so as to achieve a specific goal (e.g., lower loads, lower noise, etc.). Moreover, in an embodiment, the thickness to chord ratio (T/C) of the rotor blade may also be pushed outboard as compared to conventional rotor blades to increase structural efficiency (e.g., a large run of 21% T/C airfoil near the blade tip).

Figure 1:
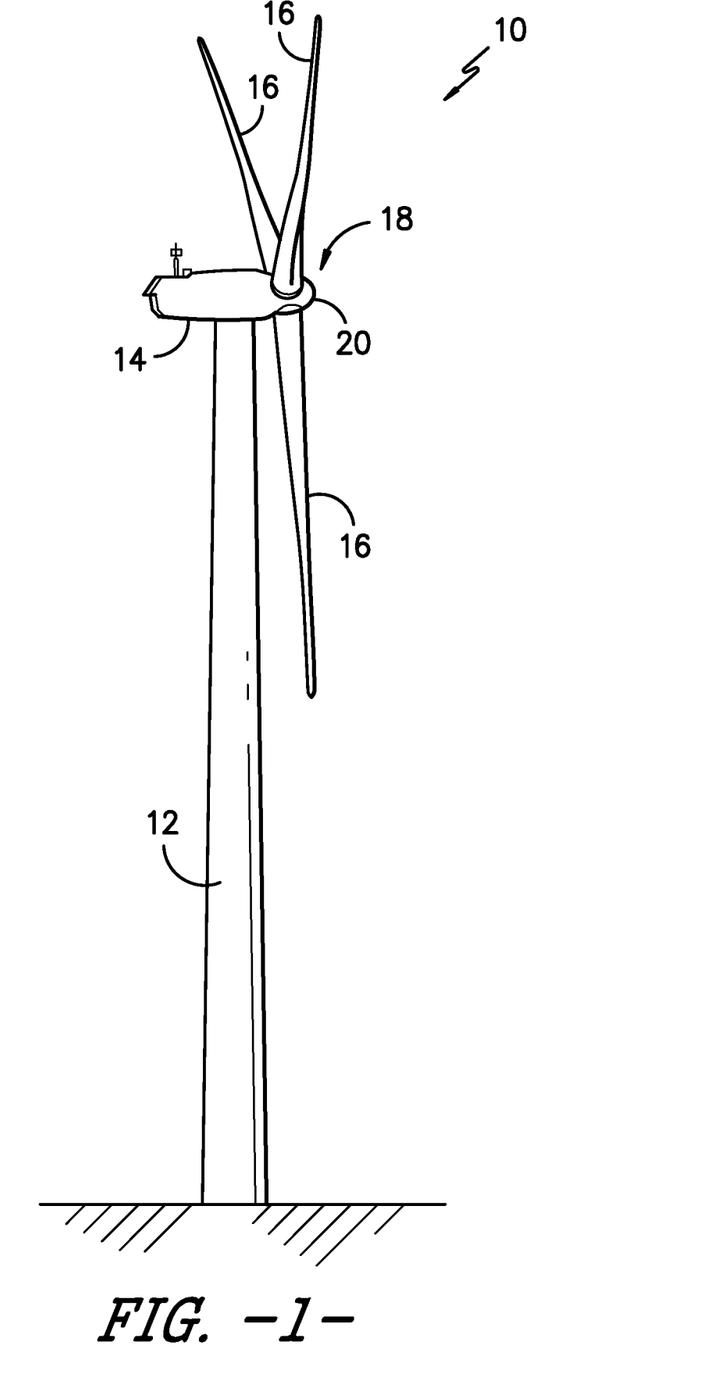
FIG. 1 illustrates a perspective view of a wind turbine according to the present disclosure.

Referring now to the drawings, FIG. 1 illustrates a wind turbine 10 according to the present disclosure. As shown, the wind turbine 10 includes a tower 12 with a nacelle 14 mounted thereon. The wind turbine 10 also includes a rotor hub 18 having a rotatable 20 with a plurality of rotor blades 16 mounted thereto, which is in turn is connected to a main flange that turns a main rotor shaft (not shown). Further, the wind turbine power generation and control components are typically housed within the nacelle 14. The view of FIG. 1 is provided for illustrative purposes only to place the present invention in an exemplary field of use. It should be appreciated that the invention is not limited to any particular type of wind turbine configuration.

Figure 2:
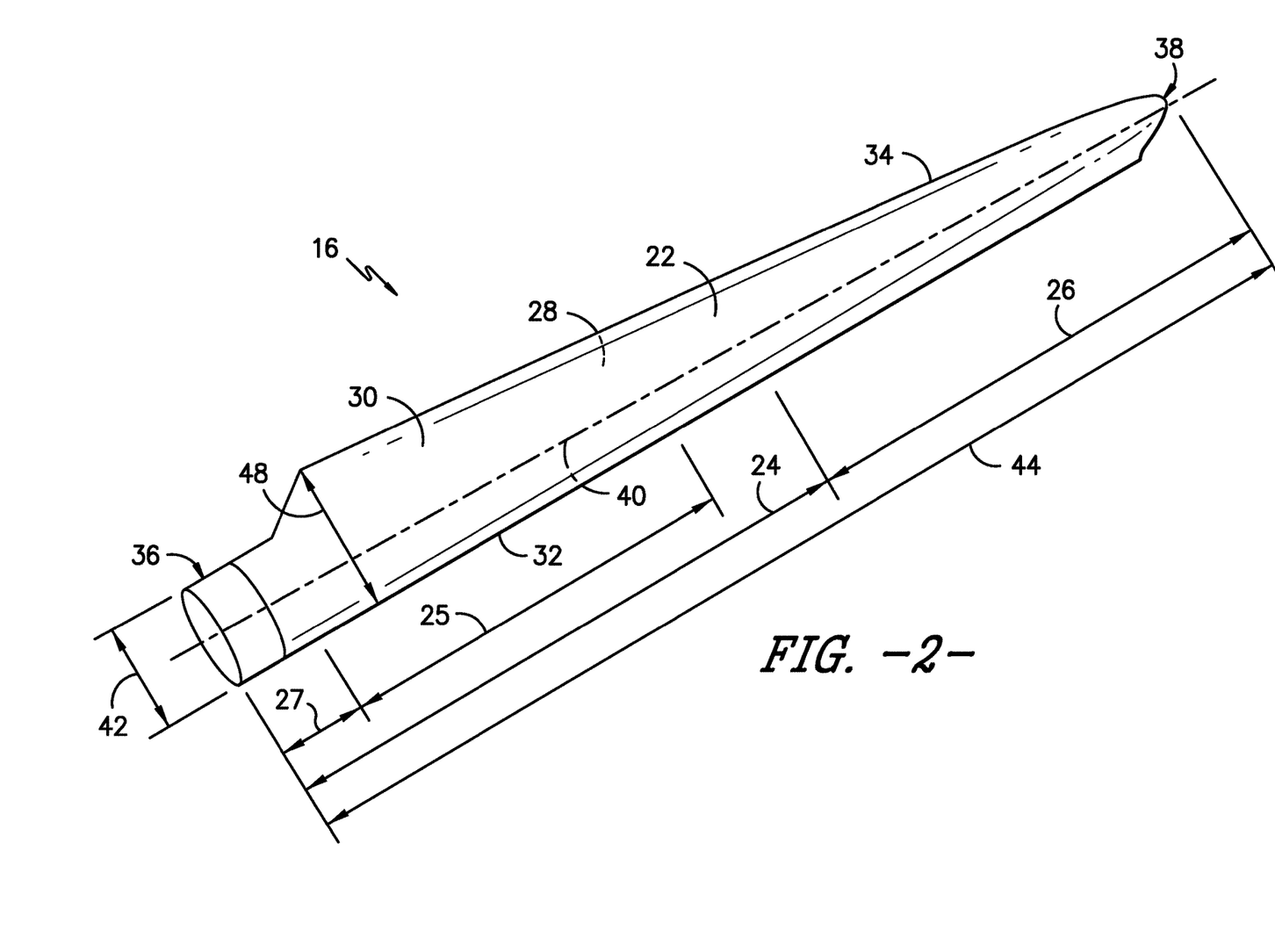
FIG. 2 illustrates a perspective view of one embodiment of a rotor blade of a wind turbine according to the present disclosure.

Referring now to FIG. 2, a perspective view of one of the rotor blades 16 of the wind turbine 10 of FIG. 1 is illustrates according to the present disclosure is illustrated. More specifically, as shown, the rotor blade 16 includes one or more features configured to reduce noise associated with high wind speed conditions. As shown, the rotor blade 16 includes an aerodynamic body 22 having an inboard region 24 and an outboard region 26. Further, the inboard and outboard regions 24, 26 define a pressure side 28 and a suction side 30 extending between a leading edge 32 and a trailing edge 34. Further, the inboard region 24 includes a blade root 36, whereas the outboard region 26 includes a blade tip 38.

Moreover, as shown, the rotor blade 16 defines a pitch axis 40 relative to the rotor hub 18 (FIG. 1) that typically extends perpendicularly to the rotor hub 18 and the blade root 36 through the center of the blade root 36. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40. In addition, the rotor blade 16 further defines a chord 42 and a span 44. More specifically, as shown in FIG. 2, the chord 42 may vary throughout the span 44 of the rotor blade 16. Thus, a local chord may be defined for the rotor blade 16 at any point on the blade 16 along the span 44.

In certain embodiments, the inboard region 24 may include from about 0% to about 50% of the span 44 of the rotor blade 16 from the blade root 36 in the span-wise direction, whereas the outboard region 26 may include from about 50% to about 100% of the span 44 of the rotor blade 16 from the blade root 36. More specifically, in particular embodiments, the inboard region 24 may range from about 0% span to about 40% of the span 44 of the rotor blade 16 from the blade root 36 in the span-wise direction and the outboard region 26 may range from about 40% span to about 100% span 44 from the blade root 36 of the rotor blade 16. As used herein, terms of degree (such as "about," "substantially," etc.) are understood to include a +/−10% variation.

Referring still to FIG. 2, the inboard region 24 may include a transitional region 25 of the rotor blade 16 that includes a maximum chord 48 (i.e., where slope 50 crosses zero as shown at 0.20 span). More specifically, in one embodiment, the transitional region 25 may range from about 15% span to about 30% span of the rotor blade 16. In addition, as shown, the rotor blade 16 may also include a blade root region 27 inboard of the maximum chord 48 and within the inboard region 24.

Referring now to FIGS. 3-6, various graphs illustrating chord characteristics in the transitional region 25 of the inboard region 24 of multiple rotor blades are illustrated. More particularly, as shown in each of the graphs, four curves (e.g., 50, 60, 70, and 80) are illustrated representing the rotor blade 16 of the present invention as well as three conventional rotor blades for comparison.

Figure 3:
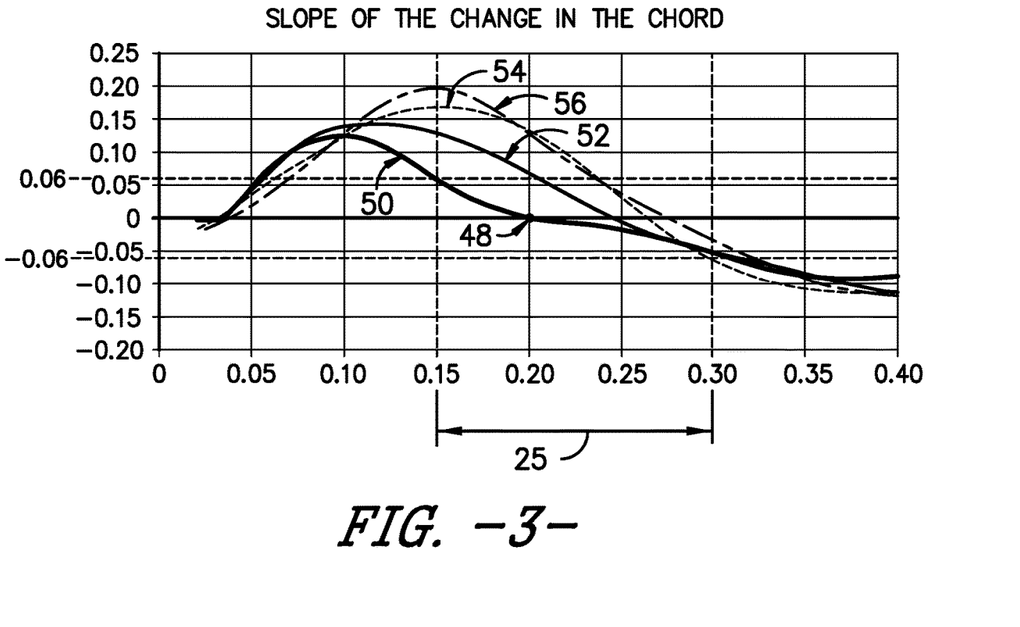
FIG. 3 illustrates a graph of one embodiment of the unitless first derivative of the chord with respect to the span in the transitional region within the inboard region of a rotor blade according to the present disclosure as compared to the chord slopes in the same region for conventional rotor blades.
Figure 4:
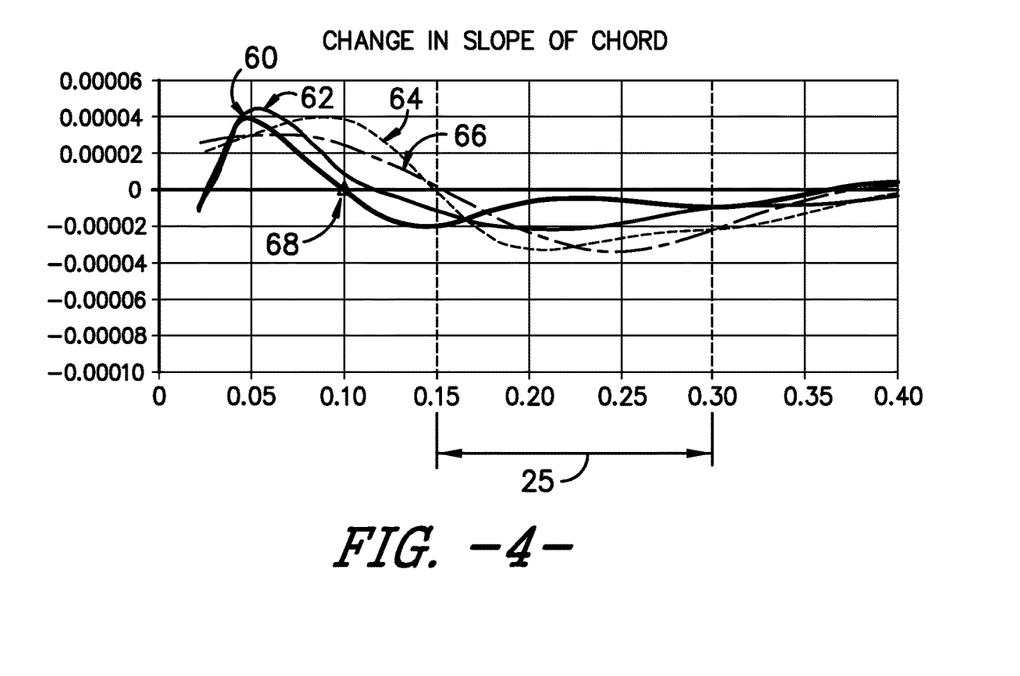
FIG. 4 illustrates a graph of one embodiment of the change in the slope of the chord in the transitional region of the inboard region of a rotor blade according to the present disclosure as compared to the changes in the slopes of the in the same region for conventional rotor blades.
Figure 5:
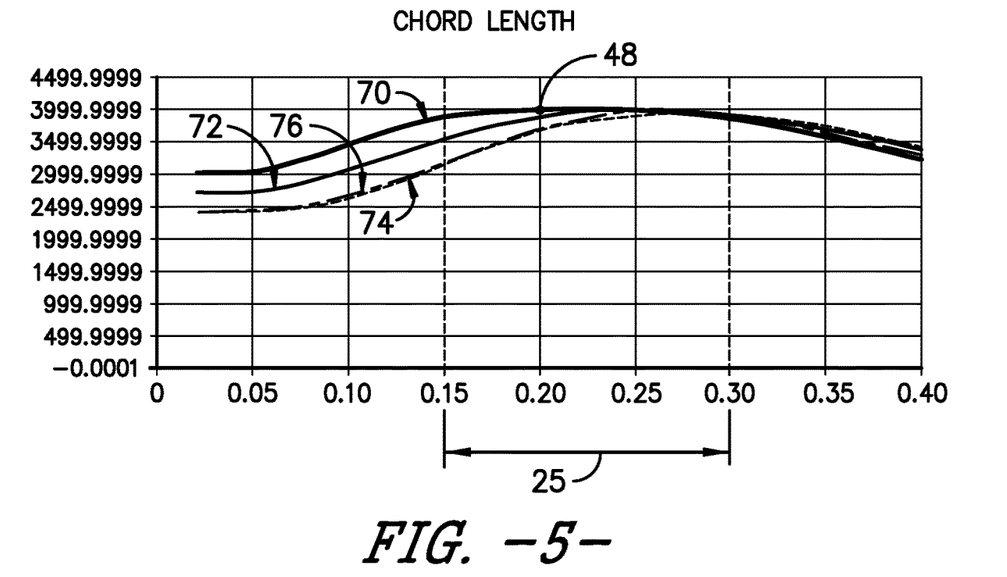
FIG. 5 illustrates a graph of one embodiment of the actual chord length (in millimeters) in the transitional region of the inboard region of a rotor blade according to the present disclosure as compared to the chord lengths in the same region for conventional rotor blades.
Figure 6:
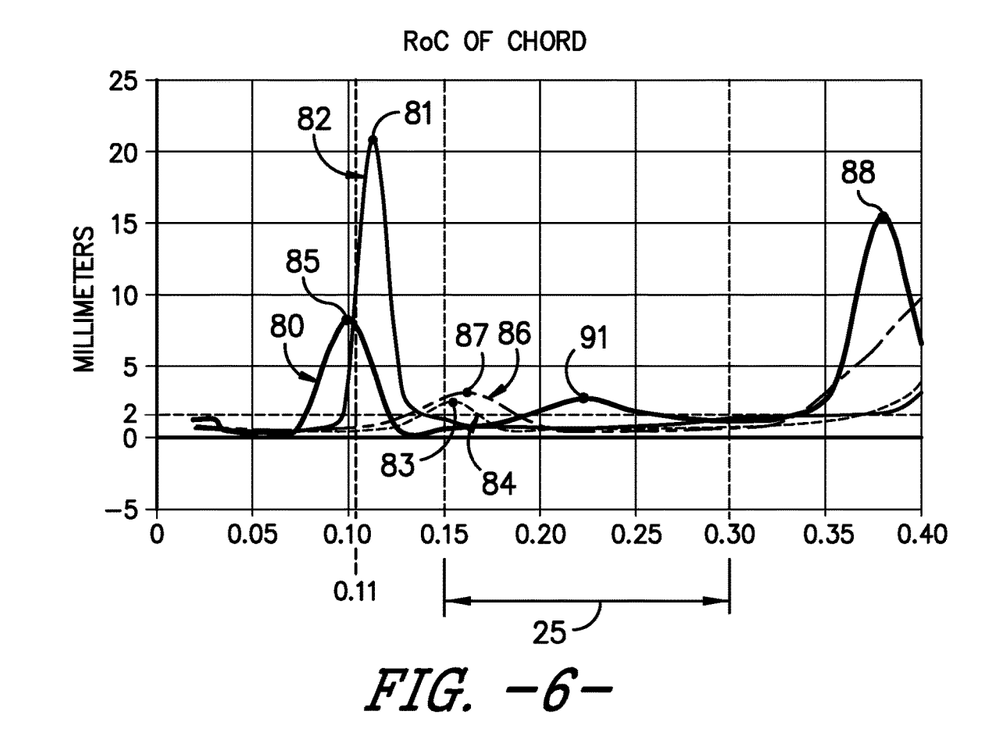
FIG. 6 illustrates a graph of one embodiment of the radius of curvature (RoC) in the transitional region of the inboard region of a rotor blade according to the present disclosure as compared to the radii of curvature in the same region for conventional rotor blades.

More particularly, FIG. 3 illustrates a graph of one embodiment of the slope 50 of the change in the chord in the transitional region 25 (e.g., from about 15% span to about 30% span) within the inboard region 24 (e.g., from about 0% span to about 40% span) of the rotor blade 16 of the present disclosure as compared to the slopes 52, 54, 56 of the change in the chord in the same region for conventional rotor blades. FIG. 4 illustrates a graph of one embodiment of the change 60 in the slope of the chord in the transitional region 25 of the inboard region 24 of the rotor blade 16 of the present disclosure compared to the changes 62, 64, 66 in the chord slope in the same region for conventional rotor blades. FIG. 5 illustrates a graph of one embodiment of the actual chord length 70 (in millimeters) in the transitional region 25 of the inboard region 24 of the rotor blade 16 of the present disclosure compared to the chord lengths 72, 74, 76 in the same region for conventional rotor blades. FIG. 6 illustrates a graph of one embodiment of the radius of curvature (RoC) 80 in the transitional region 25 of the inboard region 24 of the rotor blade 16 of the present disclosure compared to the radius of curves 82, 84, 86 in the same region for conventional rotor blades.

For example, as shown in FIG. 3, the slope 50 of the change in the chord with the blade radius in the entire inboard region 24 may range from about 0.125 (as shown as the peak of the slope 50) to about −0.9 (as shown at the far right of the graph). In another embodiment, as shown in FIG. 3, the slope 50 of the change in the chord with the blade radius within the transitional region 25 (i.e., from about 15% to about 30% span) may range from about −0.06 to about 0.6, or more preferably from about −0.10 to about 0.10 over about 15% of the span of the rotor blade 16. It should be understood that the slope 50 of the change in the chord is the first derivative of the chord distribution.

Further, as shown in FIG. 5, the chord length 70 of the rotor blade 16 is larger than the chord lengths 72, 74, 76 in the same region for conventional rotor blades. Moreover, the chord length 70 of the rotor blade 16 of the present disclosure changes less dramatically in the transitional region 25, e.g., from about 15% span to about 30% span. Further, as shown in FIG. 4, a zero location 68 of the change in the slope of the chord (i.e., the rate of change of the slope 50 of the change in the chord) may be located at less than about 15% span. More specifically, as shown in FIG. 4, the zero location 68 may be located at about 10% span.

In additional embodiments, as shown in FIG. 3, in the entire inboard region 24 (e.g., from 0% to 40% span), the slope 50 of the change in the chord may range from about −0.15 to about 0.20, more preferably from about −0.05 to about 0.15, and more preferably from about −0.01 to about 0.14.

Referring particularly to FIG. 4, in the illustrated embodiment, a unitless second derivative of the chord with respect to the span in the transitional region 25 (e.g., between 15% and 30% span) for the illustrated rotor blade 16 is greater than about −0.00002 throughout the entire transitional region 25. In contrast, the same parameter for conventional rotor blades in the transitional region 25 is less than −0.00002 throughout the entire transitional region 25.

Referring particularly to FIG. 6, in the illustrated embodiment, a peak 88 in the radius of curvature 80 of the chord outboard of the maximum chord 48 (as shown in FIG. 5 at 0.20 span) of the rotor blade 16 of the present disclosure is located inside of about 40% span. In contrast, the peaks of the radii of curvature of the chord outboard of the maximum chord for the conventional rotor blades are located outside of 40% span (as indicated by the curves 82, 84, and 86 increasing beyond 0.4 span and off the page). In addition, as shown, a peak 85 in the radius of curvature 80 of the chord inboard of the maximum chord 48 of the rotor blade 16 of the present disclosure is located within about 11% span. In contrast, the peaks 81, 83, 87 of the radii of curvature of the chord inboard of the maximum chord 48 for the conventional rotor blades are located outside of 11% span. Moreover, as shown in FIG. 6, the radius of curvature 80 at the maximum chord 48 (which is illustrated at about 20% span in FIG. 6) may be greater than about 2 millimeters. In addition, in an embodiment, as shown in FIG. 6, the radius of curvature 80 of the chord of the rotor blade 16 is markedly larger (i.e., greater than about two times larger) than the radii of curvature of the chord for the conventional rotor blades. In addition, as shown, the radius of curvature 80 of the chord of the rotor blade 16 includes an additional peak 91 (e.g., between peaks 85 and 88) that does not exist in any of the conventional rotor blades. This peak 91 represents a third reversal of the radius of curvature compared to conventional rotor blades that only have one peak.

Figure 7:
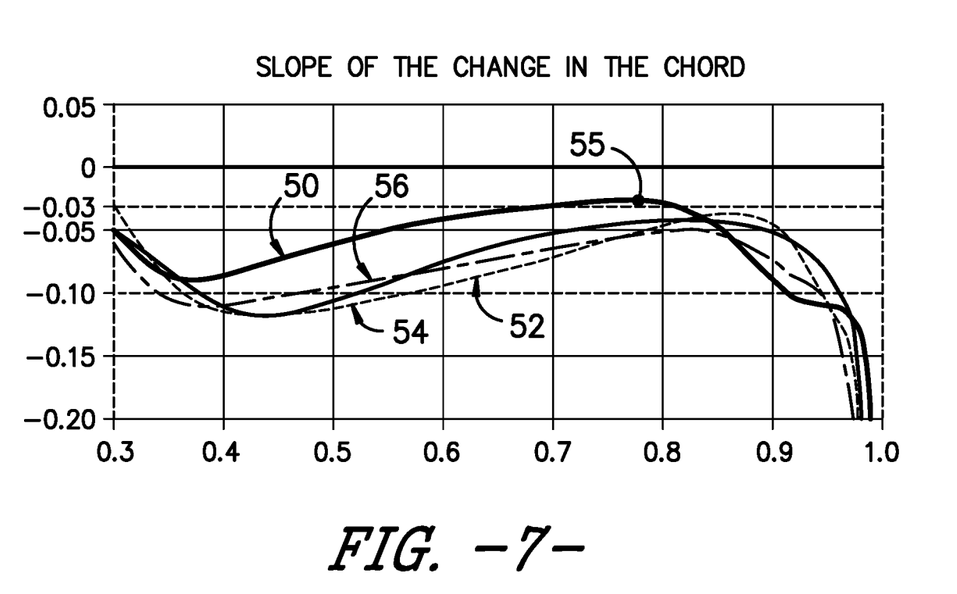
FIG. 7 illustrates a graph of one embodiment of the unitless first derivative of the chord with respect to the span in the outboard region or tip of a rotor blade according to the present disclosure as compared to same in the same region for conventional rotor blades.
Figure 8:
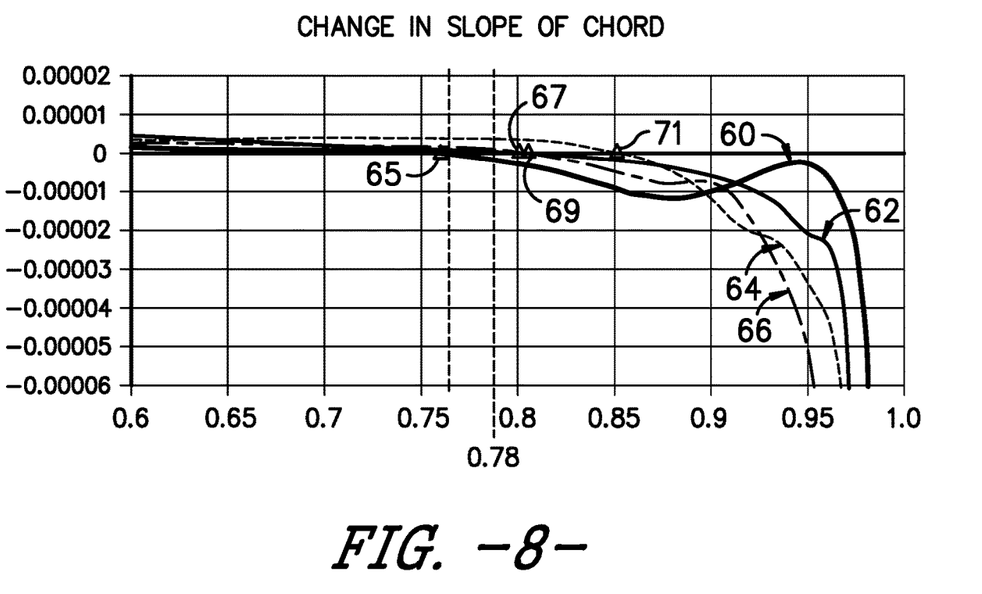
FIG. 8 illustrates a graph of one embodiment of the change in the slope of the chord in the outboard region of a rotor blade according to the present disclosure as compared to changes in the slope of the chord in the same region for conventional rotor blades.
Figure 9:
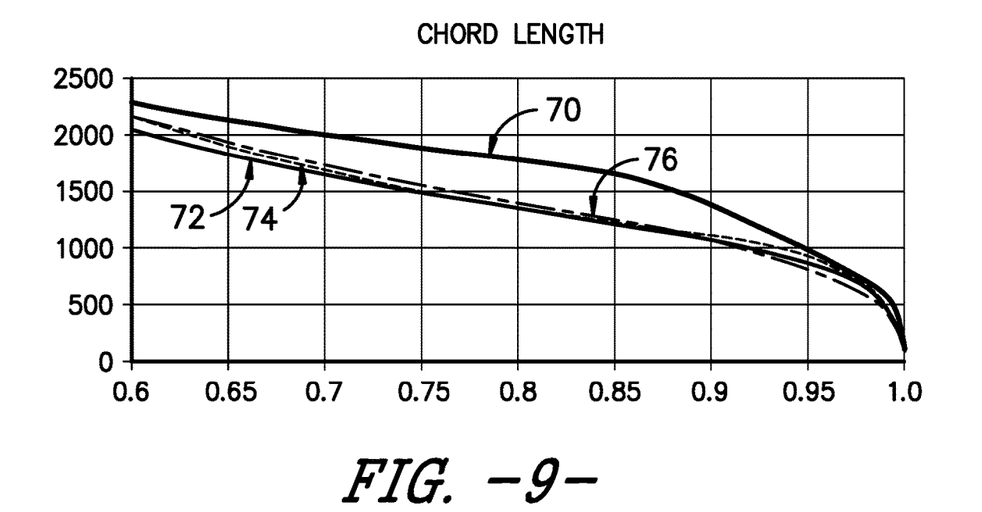
FIG. 9 illustrates a graph of one embodiment of the actual chord length (in millimeters) in the outboard region of a rotor blade according to the present disclosure as compared to the chord lengths in the same region for conventional rotor blades.
Figure 10:
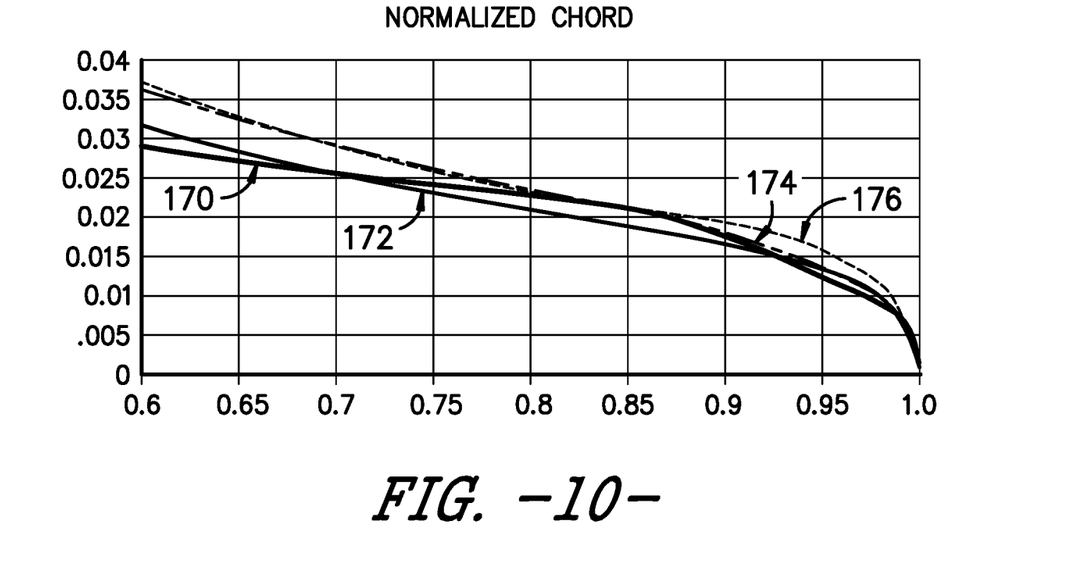
FIG. 10 illustrates a graph of one embodiment of the normalized chord in the outboard region of a rotor blade according to the present disclosure as compared to the normalized chord in the same region for conventional rotor blades.
Figure 11:
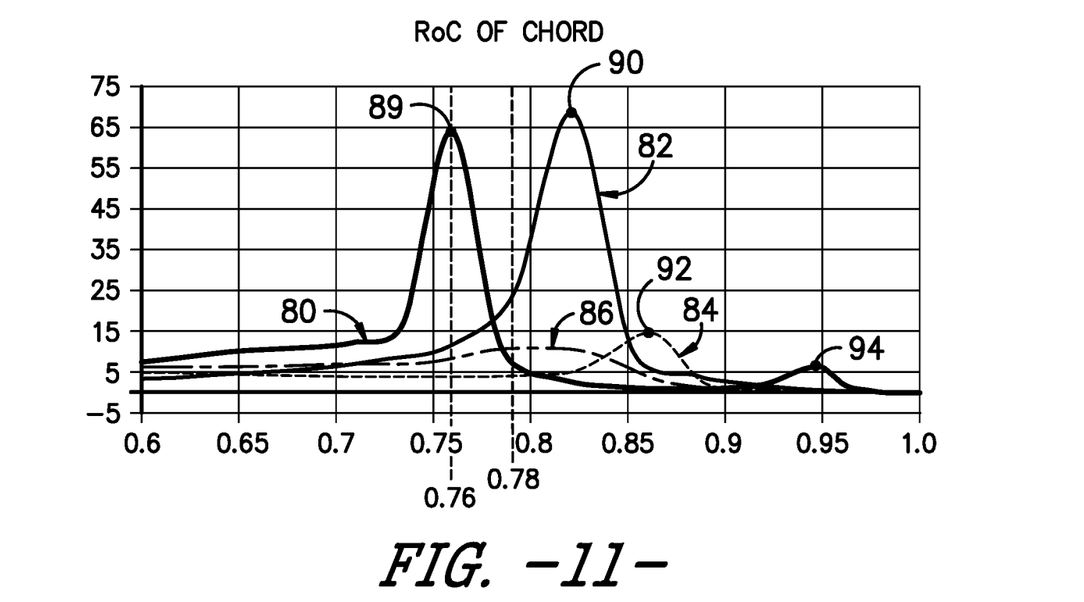
FIG. 11 illustrates a graph of one embodiment of the radius of curvature (RoC) in the outboard region of a rotor blade according to the present disclosure as compared to the radii of curvature in the same region for conventional rotor blades.

Referring now to FIGS. 7-10, various graphs illustrating chord characteristics in the outboard region 26 of multiple rotor blades are illustrated. In each of the graphs, four curves (e.g., 50, 60, 70, 80) are illustrated representing the rotor blade 16 of the present invention as well as three conventional rotor blades for comparison. More particularly, FIG. 7 illustrates a graph of one embodiment of the slope 50 of the change in the chord in the outboard region 26 of the rotor blade 16 of the present disclosure as compared to the slopes 52, 54, 56 of the change in the chord in the same region for conventional rotor blades. FIG. 8 illustrates a graph of one embodiment of the change 60 in the slope of the chord in the outboard region 26 of the rotor blade 16 of the present disclosure compared to the changes 62, 64, 66 in the chord slope in the same region for conventional rotor blades. FIG. 9 illustrates a graph of one embodiment of the actual chord length 70 (in millimeters) in the outboard region 26 of the rotor blade 16 of the present disclosure compared to the chord lengths 72, 74, 76 in the same region for conventional rotor blades. FIG. 10 illustrates a graph of one embodiment of the normalized chord 170 (in millimeters) in the outboard region 26 of the rotor blade 16 of the present disclosure compared to the chord lengths 72, 74, 76 in the same region for conventional rotor blades. FIG. 11 illustrates a graph of one embodiment of the radius of curvature (RoC) 80 in the outboard region 26 of the rotor blade 16 of the present disclosure compared to the radius of curves 82, 84, 86 in the same region for conventional rotor blades.

Referring particularly to FIG. 7, the slope 50 of the change in the chord in the outboard region 26 (i.e., outboard of 60% span) at a peak 55 from concave to convex or vice versa may be greater than about −0.03. In contrast, as shown in FIG. 7, the slopes 52, 54, 56 of the change in the chord in the outboard region 26 at the peaks from concave to convex or vice versa for conventional rotor blades is less than −0.03.

In further embodiments, as shown in FIG. 7, the slope 50 of the change in the chord may be greater than about −0.10 between about 30% span to about 85% span (as indicated by the dotted lines) from the blade root 36 of the rotor blade 16. In contrast, as shown, the slopes 52, 54, 56 of the change in the chord between about 30% span to about 85% span for conventional rotor blades is less than −0.10.

Referring particularly to FIG. 8, a point 65 at which the change 60 in the slope of the chord is zero may be within about 80% span. More specifically, as shown, the point 65 at which the change 60 in the slope of the chord is zero may be within about 78% span. In contrast, as shown, points 67, 69, 71 at which the change 62, 64, 66 in the slope of the chord is zero in the outboard region 26 for conventional rotor blades is outside of 80% span. In addition, as shown in FIG. 11, a location of a peak chord radius of curvature 89 in the outboard region 26 of the rotor blade 16 of the present disclosure may be within about 80% span (i.e., inboard of 80% span). More specifically, as shown, the peak chord radius of curvature 89 in the outboard region 26 for the rotor blade 16 of the present disclosure may be within or inboard of about 78% span. Thus, as shown, the peak chord radius of curvature 89 in the outboard region 26 for the rotor blade 16 of the present disclosure may be equal to 76% span. In contrast, as shown, the peak chord radii of curvature 90, 92, 94 in the outboard region for conventional rotor blades have a peak chord radius of curvature outboard of 80% span (e.g., to the right of the 0.8 span location).

Figure 12:
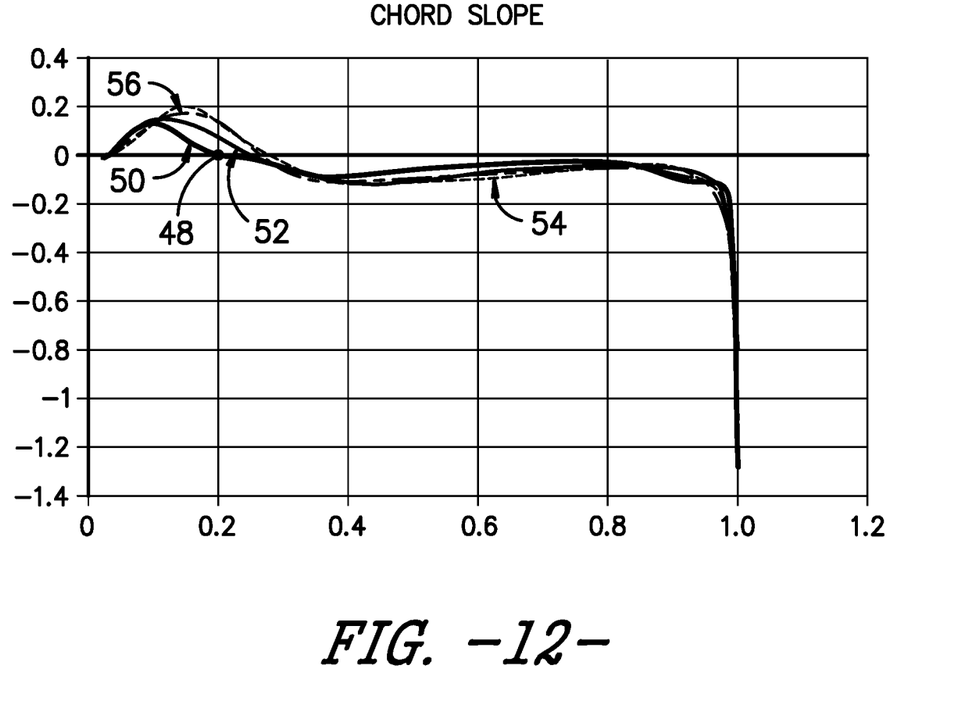
FIG. 12 illustrates a graph of one embodiment of the unitless first derivative of the chord with respect to the span of a rotor blade according to the present disclosure as compared to same in the same region for conventional rotor blades.

FIG. 12 further illustrates the slope 50 of the change in the chord for the entire rotor blade 16 as well as conventional rotor blades. Thus, as shown, FIG. 12 provides an overview of the previously-described features the entire rotor blade 16 according to the present disclosure. In particular, as shown, notable features include the more inboard peak of the slope of the change in the chord near maximum chord 48, the more inboard zero-crossing near maximum chord 48, the more inboard peak near the tip, and the more complex curve of the chord slope near the tip.

Figure 13:
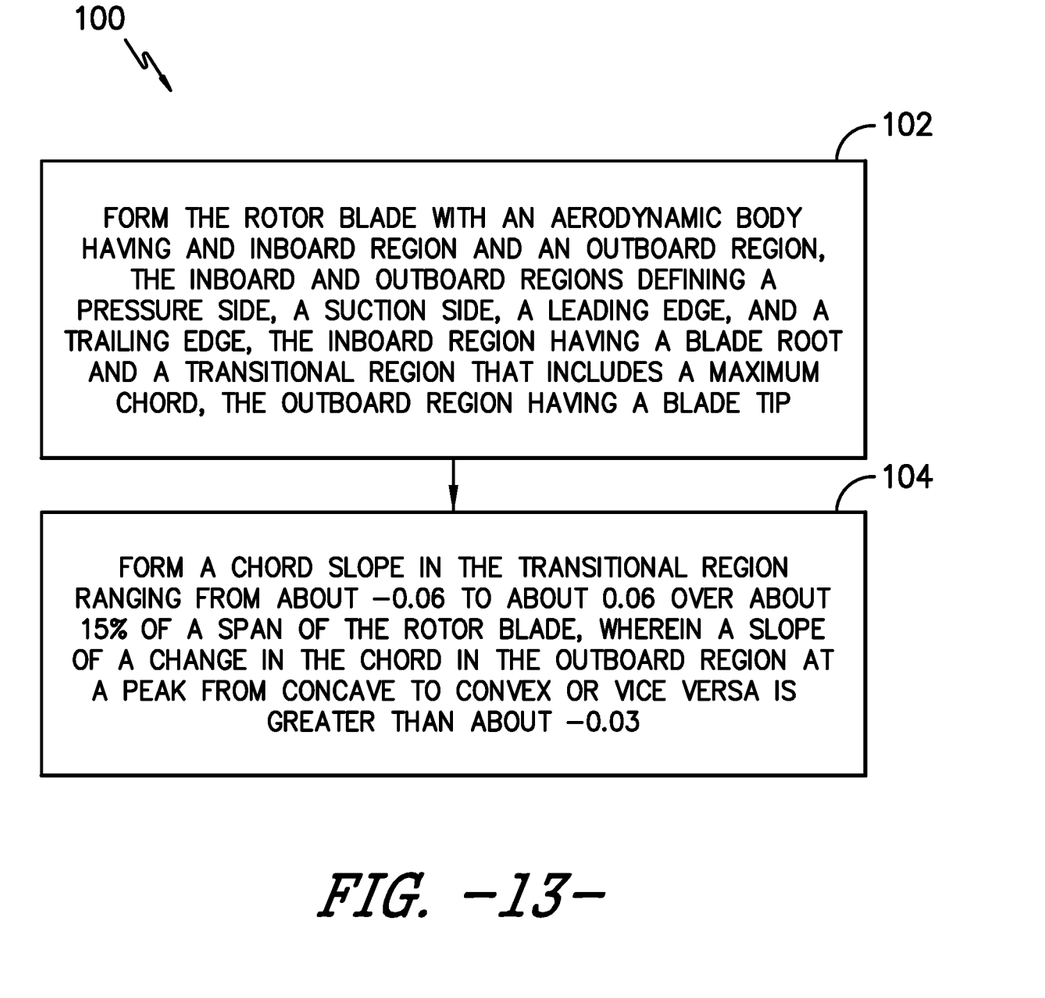
FIG. 13 illustrates a flow diagram of one embodiment of a method for manufacturing a rotor blade of a wind turbine to mitigate noise during high wind speed conditions according to the present disclosure.

Referring now to FIG. 13, a flow diagram of one embodiment of one embodiment of a method 100 for manufacturing a rotor blade of a wind turbine to mitigate noise during high wind speed conditions is illustrated. In general, the method 100 will be described herein with reference to the wind turbine 10 and rotor blade 16 shown in FIGS. 1 and 2. However, it should be appreciated that the disclosed method 100 may be implemented with wind turbines having any other suitable configurations. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming the rotor blade 16 with an aerodynamic body 22 having the inboard region 24 and the outboard region 26. Further, as mentioned, the inboard and outboard regions 24, 26 define a pressure side 28, a suction side 30, a leading edge 32, and a trailing edge 34. Moreover, the inboard region 24 includes the blade root 36 and the transitional region 25 that includes the maximum chord 48, whereas the outboard region 26 includes the blade tip 38. As shown at (104), the method 100 also includes forming a slope 50 of the change in the chord in the transitional region 25 ranging from about −0.10 to about 0.10 from the maximum chord over about 15% of a span of the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly of a wind turbine, the rotor blade assembly comprising:
    a rotor blade comprising an aerodynamic body having an inboard region and an outboard region, the inboard and outboard regions defining a pressure side, a suction side, a leading edge, and a trailing edge, the inboard region comprising a blade root, the outboard region comprising a blade tip, the rotor blade defining a chord and a span;
    the inboard region comprising a transitional region of the rotor blade that comprises a maximum chord,
    wherein a unitless first derivative of the chord with respect to the span of the rotor blade in the transitional region ranges from about −0.10 to about 0.10 from the maximum chord over about 15% of the span of the rotor blade, and
    wherein the unitless first derivative of the chord with respect to the span is greater than about −0.03 at an inflection point of the chord in the outboard region.

2. The rotor blade assembly of claim 1, wherein the unitless first derivative of the chord with respect to the span of the rotor blade in the transitional region ranges from about −0.06 to about 0.06 from the maximum chord over about 15% of the span of the rotor blade.

3. The rotor blade assembly of claim 1, wherein the transitional region comprises from about 15% span to about 30% span of the rotor blade.

4. The rotor blade assembly of claim 1, wherein the inboard region comprises from about 0% span to about 40% span from the blade root of the rotor blade in a span-wise direction and the outboard region comprises from about 40% span to about 100% span from the blade root of the rotor blade.

5. The rotor blade assembly of claim 4, wherein, in the inboard region, the unitless first derivative of the chord with respect to the span ranges from about −0.15 to about 0.20.

6. The rotor blade assembly of claim 5, wherein, in the inboard region, the unitless first derivative of the chord with respect to the span ranges from about −0.9 to about 0.125.

7. The rotor blade assembly of claim 1, wherein a second derivative of the chord in millimeters with respect to the span in millimeters is greater than −0.00002 millimeters$^{-1}$ in the inboard region.

8. The rotor blade assembly of claim 1, wherein a peak of the unitless first derivative of the chord with respect to the span is within about 80% span.

9. The rotor blade assembly of claim 1, wherein a peak in a radius of curvature of the chord inboard of the maximum chord of the rotor blade is located within about 11% span.

10. The rotor blade assembly of claim 9, wherein the radius of curvature at the maximum chord is greater than about 2 millimeters.

11. The rotor blade assembly of claim 1, wherein a location of a peak chord radius of curvature is within about 80% span.

12. A method for manufacturing a rotor blade of a wind turbine to mitigate noise during high wind speed conditions, the method comprising:
    forming the rotor blade with an aerodynamic body having an inboard region and an outboard region, a span, and a chord, the inboard and outboard regions defining a pressure side, a suction side, a leading edge, and a trailing edge, the inboard region having a blade root and a transitional region that includes a maximum chord, the outboard region having a blade tip; and
    forming a unitless first derivative of the chord with respect to the span in the transitional region ranging from about −0.06 to about 0.06 over about 15% of a span of the rotor blade, wherein the unitless first derivative of the chord with respect to the span is greater than about −0.03 at an inflection point of the chord in the outboard region.

13. The method of claim 12, wherein the transitional region comprises from about 15% span to about 30% span of the rotor blade.

14. The method of claim 12, wherein the inboard region comprises from about 0% span to about 40% span from the blade root of the rotor blade in a span-wise direction and the outboard region comprises from about 40% span to about 100% span from the blade root of the rotor blade.

15. The method of claim 12, wherein, in the inboard region, the unitless first derivative of the chord with respect to the span ranges from about −0.15 to about 0.20.

16. The method of claim 12, wherein a second derivative of the chord in millimeters with respect to the span in millimeters is greater than −0.00002 millimeters$^{-1}$ in the inboard region.

17. The method of claim 12, wherein a peak of the unitless first derivative of the chord with respect to the span is within about 80% span.

18. The method of claim 12, wherein a peak in a radius of curvature of the chord inboard of the maximum chord of the rotor blade is located within about 11% span.

* * * * *